United States Patent [19]

Ohmori

[11] Patent Number: 4,841,314
[45] Date of Patent: Jun. 20, 1989

[54] ELECTROSTATIC LATENT IMAGE FORMING APPARATUS USING SEMICONDUCTOR LASER

[75] Inventor: Naoto Ohmori, Osaka, Japan

[73] Assignee: Minolta Camera Kabushiki Kaisha, Osaka, Japan

[21] Appl. No.: 230,467

[22] Filed: Aug. 9, 1988

[30] Foreign Application Priority Data

Aug. 12, 1987 [JP] Japan .................... 62-201184

[51] Int. Cl.$^4$ ............................ G01D 15/00
[52] U.S. Cl. .................... 346/160; 346/108
[58] Field of Search ............ 346/160, 107 R, 108, 346/76 L; 355/8; 358/300, 302; 350/601, 602, 642, 6.7, 6.8

[56] References Cited

U.S. PATENT DOCUMENTS

| | | |
|---|---|---|
| 4,552,449 | 11/1985 | Wakamatsu et al. |
| 4,563,081 | 1/1986 | Sato . |
| 4,578,689 | 3/1986 | Spencer et al. ............ 346/160 |
| 4,589,764 | 5/1986 | Tadokoro et al. . |
| 4,641,200 | 2/1987 | Shoji et al. ............ 358/300 X |
| 4,728,989 | 3/1988 | Ohmori ............ 346/160 |
| 4,733,252 | 3/1988 | Daniele et al. ............ 346/160 |
| 4,745,416 | 5/1988 | Horihata ............ 346/160 |

FOREIGN PATENT DOCUMENTS

| | | | |
|---|---|---|---|
| 57-23914 | 2/1982 | Japan | 346/160 |
| 59-146017 | 8/1984 | Japan | 346/160 |
| 60-170280 | 9/1985 | Japan | 346/160 |

Primary Examiner—Arthur G. Evans
Attorney, Agent, or Firm—Price, Gess & Ubell

[57] ABSTRACT

An electrostatic latent image forming apparatus using a semiconductor laser forms an electrostatic latent image on a surface of a photoreceptor by a laser beam emitted from the semiconductor laser while intensity of the laser beam is lowered by a low reflectance mirror which reflects a part of the laser beam and transmits the remaining laser beam. A light absorbing layer is disposed behind the low reflectance mirror for absorbing the laser beam passing therethrough. The semiconductor laser is driven by current obtained by adding bias current to switching current and bias component out of an optical output level thereof is decreased by the low reflectance mirror. Therefore, an off-level optical output corresponding to the bias current becomes lower than that in the case in which lowering of the intensity of the laser beam is not caused, and as a result, a "fogging" phenomenon or the like can be effectively prevented.

12 Claims, 5 Drawing Sheets

ELECTROSTATIC LATENT IMAGE FORMING APPARATUS USING SEMICONDUCTOR LASER

BACKGROUND OF THE INVENTION

1. Field of the Invention

The present invention relates to an apparatus for forming an electrostatic latent image on a surface of a photoreceptor by using a semiconductor laser beam modulated by an image signal, and more particularly to an electrostatic latent image forming apparatus of a type in which bias current is added to current for exciting a semiconductor laser.

2. Description of the Prior Art

A so-called electrographic process in which an electrostatic latent image formed on a photoreceptor is developed by toner and transferred on paper is conventionally utilized as a printing technique in a copying machine, a printer or the like. As an apparatus for forming such an electrostatic latent image, there is known an apparatus in which a laser beam modulated by an image signal obtained by exposure and scanning of an image of a document is applied to a photoreceptor to form an electrostatic latent image on the surface of the photoreceptor. According to a proposal in the prior art, such an apparatus comprises a temperature compensating circuit.

FIG. 1 is a graph showing optical output and forward current characteristics (referred to hereinafter as P-I characteristics) of a semiconductor laser used for such an electrostatic latent image forming apparatus. In FIG. 1, the abscissa represents forward current (I) and the ordinate represents optical output (P).

As can be seen from FIG. 1, the P-I characteristics of the semiconductor laser show a sharp rise with respect to a certain current value as a boundary value which is varied according to the ambient temperature. In other words, the P-I characteristics of the semiconductor laser show parallel movements in the direction of the axis I according to the change of the ambient temperature. Thus, the optical output of the semiconductor laser changes largely dependent on the change of the temperature, causing a disturbance to image data.

FIG. 2 is a block diagram showing an automatic power control (APC) circuit proposed for the purpose of compensating for such change of optical output due to temperature change. Such an APC circuit is disclosed in detail for example in Japanese Laid-Open Patent application No. 170280/1985.

First, configuration of the APC circuit in FIG. 2 will be described.

Referring to FIG. 2, a switching portion 1 generates signal current or switching current Isw for modulating a laser beam in response to an image signal applied from a microcomputer M/C (not shown) so that the signal current or the switching current Isw is applied to a semiconductor laser L.D. An optical output level of the semiconductor laser L.D driven by the signal current is detected by a photodiode P.D and fed back to an APC portion 2. The APC portion 2 generates bias current Iba and adds it to the signal current Isw so that the optical output level of the semiconductor laser L.D may be constant. More specifically, the semiconductor laser L.D is driven by current Iop obtained by adding the bias current Iba to the signal current Isw.

Referring to FIG. 3, the operation principle of the APC circuit shown in FIG. 2 will be described. The upper half portion of FIG. 3 is a graph showing P-I characteristics of the semiconductor laser in the same manner as in FIG. 1 where the abscissa represents forward current (Iop) and the ordinate represents optical output (P). In FIG. 3, the optical output level Ps is a level corresponding to sensitivity of a photoreceptor, where an electrostatic latent image can be formed. More specifically, if a laser beam of an output level higher than the level Ps is applied to the photoreceptor, the potential at the incident point on the surface of the photoreceptor is sufficient to permit development by the toner (adhesion of the toner). On the contrary, if a laser beam of an output level lower than the level Ps is applied to the photoreceptor, the potential at the incident point on the photoreceptor is not sufficient for adhesion of the toner.

In this case, as shown in FIG. 3, the optical output level P1 (P1 > Ps) is adopted as an "on-level" signal of the optical output, which means an optical output level causing the potential of the incident point of the laser beam on the photoreceptor to be lowered to a level where the toner can be adhered.

In FIG. 3, if a case of the ambient temperature at 10° C. is considered, a current value I10 necessary for obtaining the above mentioned on-level optical output P1 is as follows.

$$I10 = Isw + Iba \quad (1)$$

Similarly, a current value I25 necessary for obtaining P1 at temperature 25° C. is as follows.

$$I25 = Isw + Iba' \quad (2)$$

In addition, a current value I50 necessary for obtaining P1 at temperature 50° C. is as follows.

$$I50 = Isw + Iba'' \quad (3)$$

In other words, current of Iba at temperature 10° C., current of Iba' at temperature 25° C. and current of Iba'' at temperature 50° C. are respectively added, as the bias current, to the switching current Isw so that the constant on-level optical output P1 can be obtained irrespective of the change in the temperature.

As a conventional electrostatic latent image forming apparatus, there is known an apparatus in which a beam attenuation filter is disposed between a laser beam generator and a photoreceptor. Such an apparatus is disclosed for example in Japanese Laid-Open Patent application No. 23914/1982 or 146017/1984. Such a beam attenuation filter is provided for the below described reason. A conventional apparatus generally comprises an SOS (start-of-scan) sensor for defining a printing start position and it is necessary to apply sufficient intensity of light to this sensor for rapid response. However, if a too intense beam is applied to the photoreceptor having high sensitivity, there are caused unfavorable effects such as deterioration of the sensitivity or damage of the photoreceptor. Therefore, a beam attenuation filter is disposed in a light path between the laser beam generator and the photoreceptor except for a light path for the SOS sensor so as to solve the above described incompatible problem. However, it is to be noted that those known techniques make no disclosure as to application of bias current to signal current for the purpose of assuring a constant optical output level as described above.

Returning again to the circuit in FIG. 2, if the switching current is cut off, namely, Isw=0, the optical output level PO is as follows.

$$PO \neq 0 \quad (4)$$

More specifically, even if the switching current is cut off (Isw=0), the optical output level PO is not completely equal to 0 because of the above described bias current (Iba at 10° C., Iba' at 25° C. and Iba" at 50° C.) and a weak optical output is generated.

Such a weak optical output PO is as follows.

$$PO < Ps \quad (5)$$

Thus, the optical output PO is in an "off-level" region, which means a region of an optical output level where the potential of the incident point of the laser beam on the photoreceptor is not sufficient to a level enabling adhesion of the toner.

However, there is a probability of adhering the toner at a boundary between the on-level region and the off-level region and even in the off-level region, although this probability is of a low degree according to the optical output of the bias current.

As a result, by adhesion of the toner occurring with such a low probability, a small amount of the toner uniformly adheres even in a range which should be white on a reproduced image, causing a so-called "fogging" phenomenon.

In addition, if a copying machine is in a wait state or in a state of initialization or the like, the above mentioned weak optical output continues to be applied to a specified region of the photoreceptor, resulting in optical fatigue.

Furthermore, such application of bias current is effected not only for the above described purpose of temperature compensation but also for the purpose of improving switching characteristics of the semiconductor laser and similar problems also occur for the latter purpose.

SUMMARY OF THE INVENTION

Briefly stated, the present invention is an electrostatic latent image forming apparatus comprising: a semiconductor laser; drive means for adding bias current to switching current molulated by an image signal and applying the current obtained of the addition to said semiconductor laser, thereby to excite the semiconductor laser to emit a laser beam; a photoreceptor having a surface on which an electrostatic latent image is to be formed by the laser beam; a scanning optical system for scanning the surface of said photoreceptor by the laser beam emitted from said semiconductor laser and forming the electrostatic latent image by the laser beam on the surface of said photoreceptor; a low reflectance mirror disposed in a path of transmission of the laser beam extending from said semiconductor laser to said photoreceptor for lowering intensity of said laser beam during the reflection of the laser beam toward the photoreceptor, the low reflectance mirror having a function which reflects a part of the laser beam and transmits the remaining laser beam; and light absorbing means disposed behind said low reflectance mirror for absorbing the laser beam passing through the low reflectance mirror.

Therefore, a principal object of the present invention is to provide an electrostatic latent image forming apparatus capable of preventing, during the existence of bias current, unfavorable effects such as a "fogging" phenomenon or optical fatigue of the photoreceptor caused by the bias current.

A principal advantage of the present invention is that by decreasing an optical output component (referred to hereinafter as a bias component) generated by bias current out of the whole optical output, an optical output level at cutoff of switching current can be lowered without decreasing the bias current value.

Another advantage of the present invention is that such functions by the bias component as compensation of any change of optical output due to temperature change or improvement of switching characteristics of the semiconductor laser can never be affected unfavorably.

These objects and other objects, features, aspects and advantages of the present invention will become more apparent from the following detailed description of the present invention when taken in conjunction with the accompanying drawings.

BRIEF DESCRIPTION OF THE PREFERRED EMBODIMENTS

Figure 4:
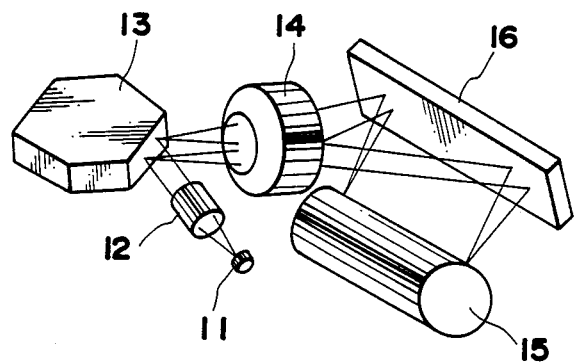
FIG. 4 is a typical perspective view showing construction of an electrostatic latent image forming apparatus of an embodiment of the present invention.

FIG. 4 is a typical perspective view showing construction of an electrostatic latent image forming apparatus of an embodiment of the present invention.

First, the construction of the embodiment shown in FIG. 4 will be described.

Figure 2:
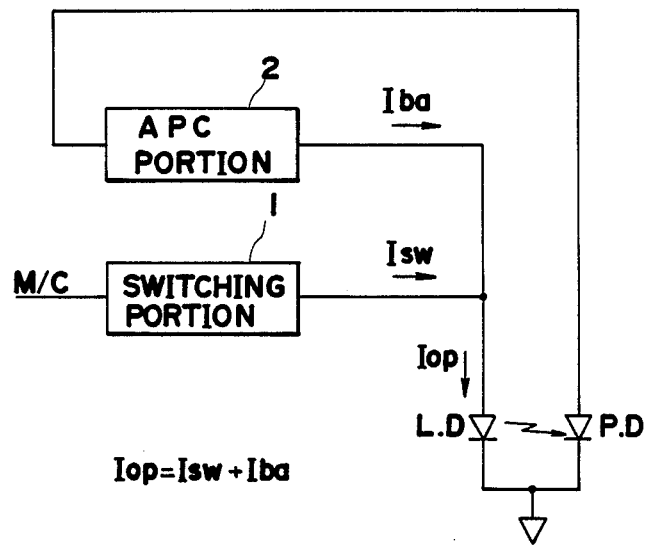
FIG. 2 is a block diagram showing an automatic power control (APC) circuit for compensating the change of optical output due to temperature change.
Figure 3:
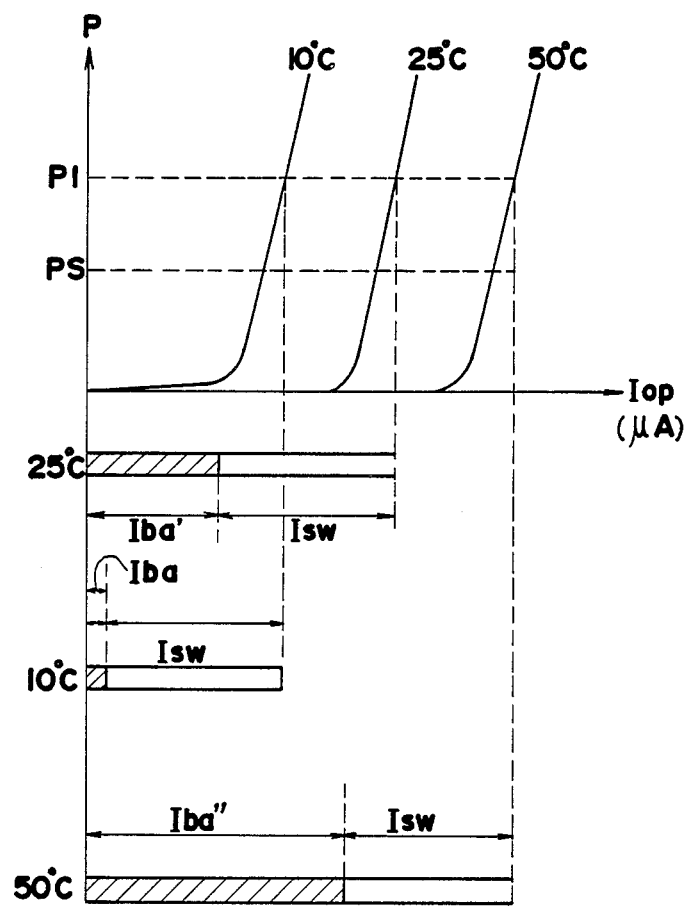
FIG. 3 is a graph for explaining operation of the APC circuit shown in FIG. 2.

Referring to FIG. 4, a semiconductor laser 11 is driven by the APC circuit shown in FIG. 2 so that a laser beam modulated by an image signal is emitted. The beam emitted from the semiconductor laser 11 is caused to be a parallel beam through a collimator lens 12 and then it is applied to a polygon mirror 13. The polygon mirror 13, which rotating rapidly, reflects the parallel beam applied from the collimator lens 12 so that the reflected beam is applied to an f·θ lens 14. The f·θ lens 14 converges the reflected light from the polygon mirror 13 and applies the converged beam to a reflection mirror 16 having a low reflectance. The reflection mirror 16 reflects the beam from the f·θ lens 14 by lowering the intensity that an image is formed on the surface of the photoreceptor drum 15.

In the embodiment shown in FIG. 4, the semiconductor laser 11, the collimator lens 12, the polygon mirror 13, the f·θ lens 14 and the photoreceptor drum 15 are the same as in the conventional apparatus.

Figure 5:
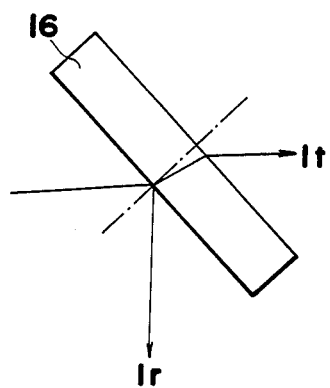
FIG. 5 is an explanatory view showing a function of a reflection mirror shown in FIG. 4.
Figure 6:
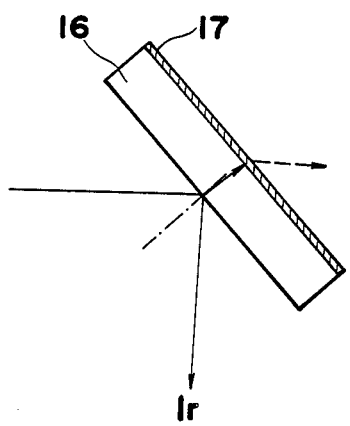
FIG. 6 is a side view showing the reflection mirror with an absorbing layer in the embodiment.

On the other hand, as shown in FIG. 5, the reflection mirror 16 reflects a part of the beam Ir and transmits the remaining beam It, so that the reflection mirror 16 has a considerable low reflectance, i.e. 30% as is different from the mirror of the conventional apparatus having the reflectance of 90% or over. Referring to FIG. 6, a light absorbing layer 17 is formed on the rear surface of the reflection mirror 16 for absorbing the beam It passing therethrough to prevent an influence thereof. The absorption rate of the layer 17 is set to 93% or over by controlling the material and the thickness of the layer 17. Consequently, the beam passing through the mirror 16 is dropped off 5% of the incident beam or less. The layer 17 may contain carbon.

Figure 7:
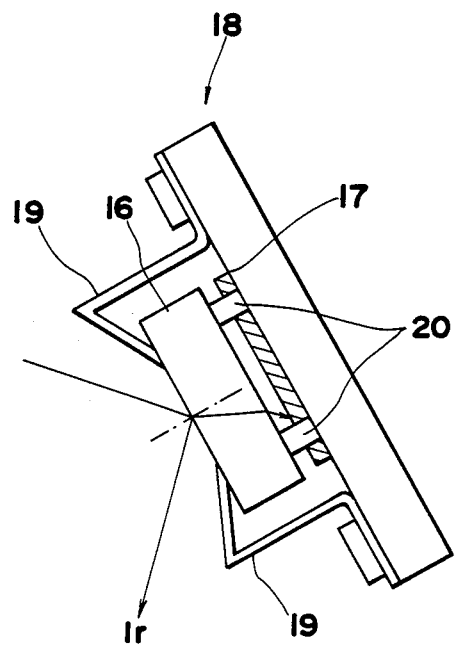
FIG. 7 is a side view of modification of the embodiment showing, the reflection mirror which is held by a mirror holder.

As shown in FIG. 7, the reflection mirror 16 may be held by a mirror holder 18 disposed behind the mirror 16 via springs 19 and support members 20. In this case, the light absorbing layer 17 may be formed on the surface of the holder 18 which opposes to the rear surface of the reflection mirror 16.

Furthermore, it is possible to provide a light absorbing function to the reflection mirror 16 instead of location of the light absorbing layer 17 by modification of the material of the mirror 16.

Figure 1:
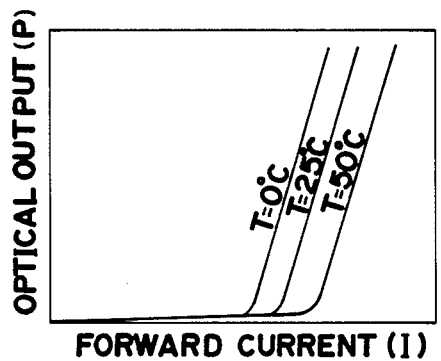
FIG. 1 is a graph showing P-I characteristics of a semiconductor laser used in an electrostatic latent image forming apparatus.
Figure 8:
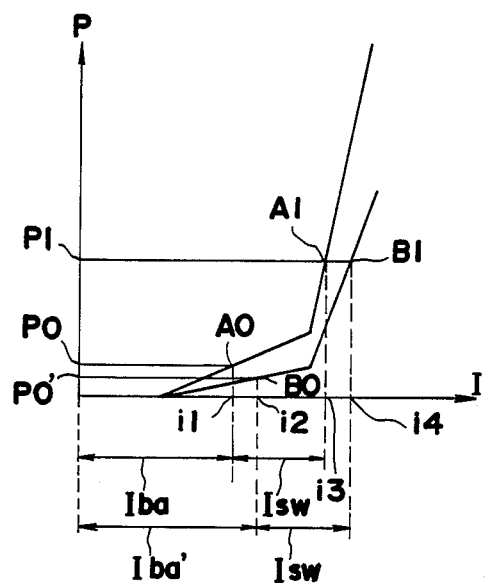
FIG. 8 is a graph for explaining operation of the embodiment shown in FIG. 4.

FIG. 8 is a graph for explaining operation of the embodiment shown in FIG. 4, which shows, in an enlarged manner, the rising portion of the P-I characteristics of the semiconductor laser as shown in FIG. 1 for example.

Referring to FIGS. 4 and 8, the operation of this embodiment will be described.

In FIG. 8, the abscissa represents forward current (I) and the ordinate represents optical output (P). In this figure, "A" shows the conventional case in which intensity of the beam is not lowered and "B" shows the case of the present invention in which intensity of the beam is uniformly lowered by the reflection mirror 16 having low reflectance.

Referring to FIG. 8, in the case A, an on-level optical output P1 and an off-level optical output P0 are obtained at the point A1 (i3, P1) and at the point A0 (i1, P0), respectively. On the other hand, in the case B, an on-level optical output P1 and an off-level optical output P0' are obtained at the point B1 (i4, P1) and at the point B0 (i2, P0'), respectively. More specifically, if the on-level optical output has the same value (P1) in the cases A and B, the off-level outputs are in a relation of A>B (P0>P0'). In other words, if the light intensity is lowered, only the off-level optical output P0 can be lowered without lowering the on-level optical output P1.

More specifically, if the initial surface potential V0 of the photoreceptor is 500V and the development bias voltage VB is 400V, a voltage drop of 80V is caused by the off-level output and V0 becomes 420V in the conventional apparatus, while, if the reflection mirror 16 having a reflectance 30% in this embodiment is used, the initial surface potential V0 is 480V and a wide margin for prevention of fogging is allowed with respect to the development bias potential BV=400V. As a result, the "fogging" phenomenon can be effectively prevented.

In a copying machine comprising an electrostatic latent image forming apparatus of this embodiment, when the copying machine is in a wait state or when initialization is being effected in the copying machine, the optical output of the bias component does not continue to be applied to the photoreceptor and, thus, optical fatigue of the photoreceptor can be prevented and the lifetime thereof can be lengthened.

Although the mirror having the reflectance 30% is used in the above described embodiment, any suitable mirror may be used if it has a reflectance in a range from 20 to 60%.

In the above described embodiment, in order to maintain the on-level optical output at the same level P1 as in the conventional apparatus, bias current is increased from i1 to i2. In other words, the switching current Isw is not changed. This is for the purpose of not changing the rising characteristics at the time of switching. Therefore, if no influence is caused in the rising characteristics at the time of switching, the switching current may be increased without changing the bias current.

Although no mention is made of the location of the SOS sensor in the above described embodiment, this sensor is preferably located at a position coming before the position where the optical output level is lowered.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrostatic latent image forming apparatus comprising:
   a semiconductor laser;
   drive means for adding bias current to switching current modulated by an image signal and applying the current obtained by the addition to said semiconductor laser, thereby to excite the semiconductor laser to emit a laser beam;
   a photoreceptor having a surface on which an electrostatic latent image is to be formed by the laser beam;
   a scanning optical system for scanning the surface of said photoreceptor by the laser beam emitted from said semiconductor laser and forming the electrostatic latent image by the laser beam on the surface of said photoreceptor;
   a low reflectance mirror disposed in a path of transmission of the laser beam extending from said semiconductor laser to said photoreceptor for lowering intensity of said laser beam during reflecting the laser beam toward the photoreceptor, the low reflectance mirror having a function which reflects a part of the laser beam and transmits the remaining laser beam; and
   light absorbing means disposed behind said low reflectance mirror for absorbing the laser beam passing through the low reflectance mirror.

2. An electrostatic latent image forming apparatus as claimed in claim 1, wherein said light absorbing means is a light absorbing layer coating the rear surface of said low reflectance mirror.

3. An electrostatic latent image forming apparatus as claimed in claim 2, wherein said light absorbing layer contains carbon.

4. An electrostatic latent image forming apparatus as claimed in claim 1, further comprising a mirror holder disposed behind said low reflectance mirror for holding, wherein said light absorbing means is a light absorbing layer coating the surface of said mirror holder opposing said low reflectance mirror.

5. An electrostatic latent image forming apparatus as claimed in claim 1, wherein the reflectance of said low reflectance mirror is in a range from 20% to 60%.

6. An electrostatic latent image forming apparatus as claimed in claim 1, wherein the absorption rate of said light absorbing means is 93% or over.

7. In a laser printer having a laser that can be excited to produce an image on a photoreceptor surface through a scanning optical system, the improvement comprising:
a low reflectance mirror positioned in the path of transmission of the laser beam between the laser and the photoreceptor surface for lowering the intensity of the laser beam, the angle of incidence of the laser beam and mirror permitting a transmission of a portion of the beam and a reflectance of another portion toward the photoreceptor surface, and means for preventing the transmitted portion of the laser beam from being reflected toward the photoreceptor surface.

8. The invention of claim 7 wherein the means for preventing includes a light absorbing layer.

9. An electrostatic latent image forming apparatus as claimed in claim 8, wherein said light absorbing layer contains carbon.

10. An electrostatic latent image forming apparatus as claimed in claim 8, further comprising a mirror holder disposed behind said low reflectance mirror for holding, wherein said light absorbing layer coats the surface of the mirror holder opposite the low reflectance mirror.

11. An electrostatic latent image forming apparatus as claimed in claim 8, wherein the reflectance of said low reflectance mirror is in a range from 20% to 60%.

12. An electrostatic latent image forming apparatus as claimed in claim 8, wherein the absorption rate of said light absorbing laser is 93% or over.

* * * * *